March 10, 1953     J. S. PALMER     2,631,089

APPARATUS FOR CONDUCTING CONVERSION OPERATIONS

Filed Aug. 16, 1950

INVENTOR.
Jewell S. Palmer
BY
AGENT.

Patented Mar. 10, 1953

2,631,089

UNITED STATES PATENT OFFICE 2,631,089

APPARATUS FOR CONDUCTING CONVERSION OPERATIONS

Jewell S. Palmer, Baytown, Tex., assignor, by mesne assignments, to Standard Oil Development Company, Elizabeth, N. J., a corporation of Delaware Application August 16, 1950, Serial No. 179,838

5 Claims. (Cl. 23—288)

1

The present invention is directed to apparatus in which a conversion operation may be conducted in the presence of finely divided fluidized solids. The invention is particularly directed to apparatus for catalytic conversion operations, such as catalytic cracking of hydrocarbons, and the like.

The apparatus of the present invention comprises a reaction vessel such as an elongated reaction vessel in the lower portion of which is an inlet line through which a suspension of finely divided solids may be introduced thereto. Arranged in the upper end of the vessel is an outlet through which finely divided solids in a gasiform suspension may be withdrawn. The vessel is so operated that a dense phase of finely divided solids in a gasiform suspension is maintained therein below a dispersed phase. The outlet is provided with means in a passageway leading thereto, such as a valve, for controlling the flow of suspension therethrough. The level of the dense phase in the elongated vessel may be controlled by means for withdrawing suspension containing finely divided solids from a point immediately above the normal level of the dense phase into said outlet.

The means for varying the flow of suspension through said outlet may include a valve in a passageway leading to said outlet arranged either interiorly or exteriorly to said vessel. In short, the outlet may have a valve arranged therein inside of the vessel or outside thereof. Similarly, the means for withdrawing suspension from immediately above the dense phase may include a downwardly projecting extension of said outlet in which is arranged at least one passageway which may be a plurality of slotted passageways or may be a plurality of orifices. In either case, the passageway or ways will be arranged immediately above and below the dense phase level in said vessel. Alternatively, rather than the outlet being provided with a downwardly projecting extension member, the vessel may have arranged, on the exterior thereof, a plurality of conduits fluidly communicating the interior of said vessel at points above and below said dense phase with said outlet. A further modification of my invention embodies another passageway arranged in said extension to said outlet at an upper point in said vessel and means for opening and closing said outlet.

The invention will be further described by reference to the drawing in which.

Figure 1:
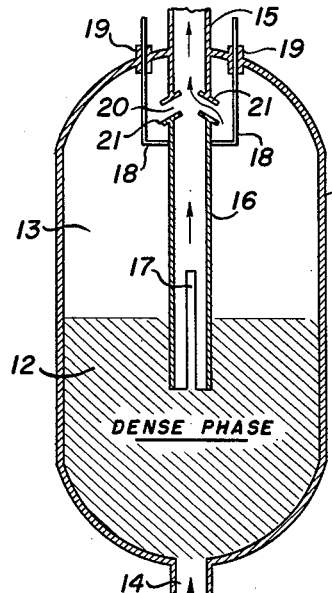
Fig. 1 is a cross-sectional view of one embodiment thereof with an elongated reaction vessel provided with an inlet and an outlet and a downwardly extending extension of said outlet with means for raising and lowering said downwardly extending member.
Figure 2:
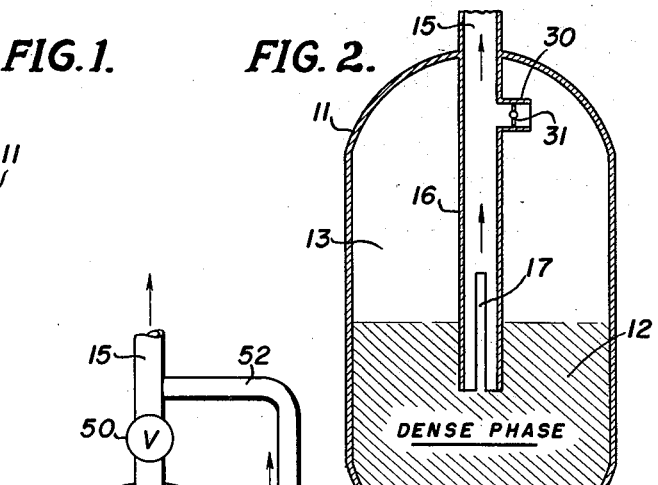
Fig. 2 is a modification of the embodiment of Fig. 1 wherein the downwardly extending member is provided with a passageway at the upper end thereof and means for opening and closing said passageway.
Figure 4:
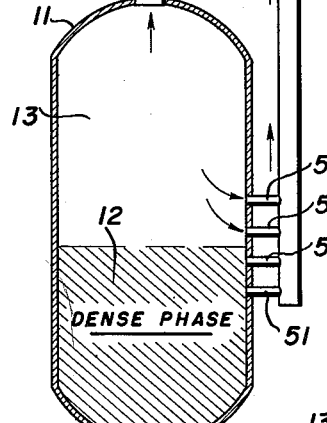
Figure 3:
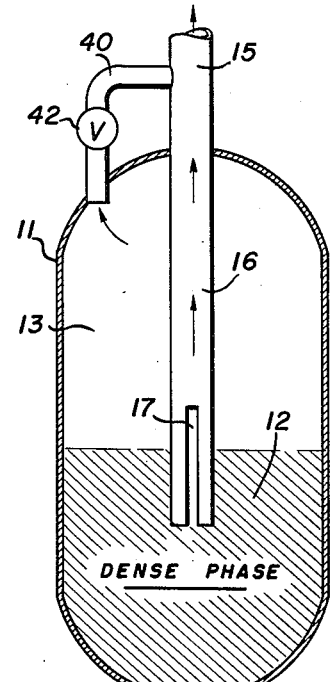
Fig. 3 is a still further modification of the present invention whereby the flow through the outlet is varied by means of a plurality of conduits with valve means arranged therein.
Figure 5:
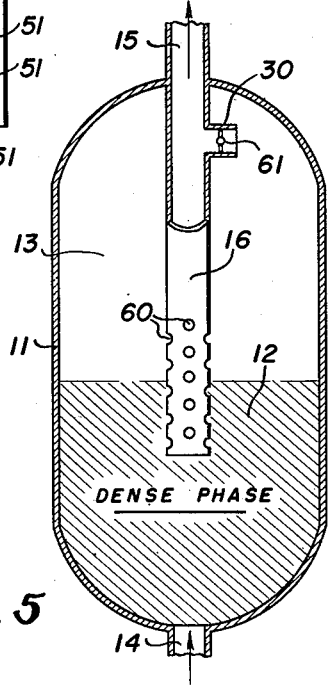

Fig. 4 is a still further embodiment of the present invention wherein the downwardly extending member is replaced by a plurality of conduits exterior to the vessel communicating the interior thereof with the outlet; and Fig. 5 is a still further modification of Figs. 1 to 3, inclusive, where the slotted passageway is replaced by a plurality of orifices arranged in the downwardly extending projecting member.

Referring now to the drawing, in which identical parts will be identified by identical numbers, and especially to Fig. 1, numeral 11 designates an elongated reaction vessel such as a catalytic cracking reactor in which a dense phase of catalyst, indicated by the shaded portion 12, is maintained by adjustment of velocity therein. Above the dense phase of the catalyst a disperse phase 13 of catalyst is maintained. The vessel 11 is provided with an inlet 14 and an outlet 15. As an extension of outlet 15, a downwardly projecting extension member or dip leg 16 projects below the surface of the dense phase 12 and connects the outlet 15 therewith. The dip leg or downwardly projecting extension member 16 defines a slotted passageway 17 which may extend from the bottom open end thereof to a point well above the normal level of dense phase 12. It will be understood that slotted passageway 17 may be a plurality of slotted passageways. The downwardly projecting member or dip leg 16 is held in juxtaposition with outlet 15 by a movable support 18 which is so arranged with stuffing boxes 19 to allow raising and lowering of dip leg 16. The movable supports may be actuated to raise or lower dip leg 16 manually or by suitable power means such as fluid operated motors, hydraulic cylinders, electrically operated means, and the like. These means are not shown. Dip leg 16 and outlet 15 define an annular passageway 20 fluidly communicating the disperse phase 13 with outlet 15. The lower end of outlet 15 and the upper end of dip leg 16 are provided with erosion shoes 21 to prevent erosion of these parts of the apparatus on passage of suspension of finely divided solids therethrough.

Referring now to Fig. 2, it will be seen that this modification of my invention is generally similar to Fig. 1 but differs in that the dip leg or extension member 16 is made an integral part of outlet 15 as a downwardly extending projection thereof. At the upper end of dip leg 16 there is defined an outwardly projecting conduit 30 which communicates the disperse phase 13 in vessel 11 with the interior of extension member 16. Conduit 30 may conveniently be a plurality of conduits defining a plurality of passageways but only one is shown for briefness of description. Flow through this passageway 30 is controlled by a valve 31 which may be operated from the exterior of the vessel.

A still further modification of the present invention is illustrated in Figure 3 in which the vessel 11 is provided with a conduit 40 in which is arranged a valve or flow control member 42. Conduit 40 communicates the upper interior of vessel 11 with outlet 15 and allows passage of suspension from the disperse phase 13 to outlet 15.

A still further embodiment of the invention is illustrated in Fig. 4 in which the extension member or dip leg 16 is dispensed with. In this modification of my invention the outlet 15 is provided with a control valve 50 arranged in outlet 15 exterior to vessel 11 and a plurality of conduits 51 are arranged on the exterior of vessel 11 at points above and below the level of dense phase 12 therein. These conduits 51 discharge into a common manifold or conduit 52 which, in turn, discharges into outlet 15 at a point downstream from valve 50.

In Fig. 5 a still further modification of my invention is presented in which the dip leg 16 defines a plurality of orifices 60 which are arranged above and below the normal upper level of dense phase 12 as shown. In this modification of my invention the valve or means for controlling the flow through outwardly projecting conduit 30 is shown as a valve 61 arranged in member 30 on the interior of the vessel. Similar to Fig. 2 conduit 30 may be a plurality of conduits each controlled by separate valve means defining a plurality of controlled passageways.

In conducting reactions in vessels similar to those illustrated in the several figures of the drawing, for example, catalytic cracking operations, all of the fluidized catalyst fed to the reaction vessel, as a suspension of finely divided solids in the vaporized hydrocarbon, must pass out of the top of the reactor with the cracked hydrocarbon vapors as a suspension therein. As a result the depth of the catalyst bed is dependent upon the velocity of vapors through the reactor and is not readily controllable by means conventional to the art. In the device illustrated in Fig. 1 of the drawing, the slotted dip pipe 16 is open at both the top and the bottom and is provided with suitable means for raising and lowering this pipe. Thus in operation with dip pipe 16 at its lowest position substantially all the vapors and catalyst will pass outside the dip pipe and through the open space between the top of dip pipe 16 and the outlet 15 indicated by numeral 20 and thus leave the reactor through outlet 15. In this position the vessel will operate at its maximum dense phase level. By raising the dip pipe 16 the opening 20 is reduced and the pressure drop through this space 20 is thereby increased. When this is done additional quantities of vapors and catalyst pass through the slot 17 and up through dip pipe 16 and outwardly through outlet 15. This results in lowering the bed level in the vessel and thus the catalyst holdup or retention time in the reaction vessel may be controlled.

The embodiment of Fig. 2 operates in a similar manner. Instead of raising or lowering the extension member 16, the valve 31 may be opened or closed. When the valve 31 is at its maximum open position the dense phase 12 will be at its maximum height. By closing this valve or adjusting it towards a closed position, the level of dense phase 12 may be varied at will.

The modification of Fig. 3 operates similarly to that of Figs. 1 and 2 except in this instance a conduit 40 is provided. By operating valve 42 the amount of suspension passing through conduit 40 into outlet 15 is decreased thus causing more suspension to pass through the slotted passageway 17 and thus lowering the level of the dense phase 12 in vessel 11.

The embodiment of Fig. 4, in which the extension member or dip leg 16 is dispensed with, operates in a similar manner with the other embodiments. In this mode of operation the valve 50 may be partially closed causing the suspension to pass through the conduits 51 above the dense phase 12 in reactor 11. While not shown in Fig. 4, it is to be understood that the conduits 51 may be provided with valves to allow further adjustment of the flow therethrough.

The modification of the present invention of Fig. 5 operates generally similar to the embodiments of Figs. 1 to 4, the only difference being that, instead of a slot 17, a plurality of orifices 60 are provided. In this embodiment the adjustment of valve 61 toward the closed position causes more of the suspension to pass through the orifice 60 above the dense phase 12 and outwardly through outlet 15 and thereby lowering the level of the dense phase 12.

The invention may be further illustrated with relation to a commercial unit having a capacity of 33,000 barrels per day of hydrocarbon feed stock and products. Through the equivalent of reactor 11 and extension member 16 may pass 30 tons of finely divided catalyst having particle diameters in the range of 0 to 200 microns with the major portion of the catalyst having particle diameters in the range of 20 to 100 microns. Suitable catalysts include silica-alumina, silica-magnesia, silica-zirconia, alumina and other finely divided particles. The slots 17 may be two 2-inch slots or four 1-inch slots or may be spaced at 120° intervals and having a width of 1½ inches per slot. The dimensions of the slots or perforations or orifices, as the case may be, should be adjusted to give a superficial gas velocity through the slot and up the dip leg in the range from about 25 to 125 feet per second. Good results may be obtained at a gas flow equivalent to a velocity of 70 feet per second through the open area of the slot in the disperse phase. Actual operations have been conducted in the operating unit having a capacity of 33,000 barrels per day with a gas velocity through the slot of 70 feet per second.

The invention is not restricted to catalytic cracking operations but may be applied to any operations in which a suspension of finely divided solids is introduced into a reaction vessel and a suspension of finely divided solids removed therefrom. As examples of such operations besides catalytic cracking operations may be mentioned the synthesis of hydrocarbons and oxygenated organic compounds from carbon monoxide and hydrogen by contact with a synthesis catalyst, such as promoted iron oxide in finely divided form, the catalytic oxidation of hydrocarbons, the synthesis of oxygenated compounds by the so-called Oxo process and many other reactions, either catalytic or non-catalytic, too numerous to mention here. As an example of a non-catalytic operation, in which the present invention may be employed, may be mentioned the gasification of coal and the recovery of hydrocarbons from shales in finely divided form.

The nature and objects of the present invention having been fully described and illustrated, what I wish to claim as new and useful and to secure by Letters Patent is:

1. Apparatus for conducting conversion operations in which a dense phase of finely divided fluidized solids is maintained below a disperse phase of said solids which comprises, in combination, a vertically elongated vessel; a first conduit communicating with said vessel at a low point thereof for conveying a suspension of finely divided solids in a gasiform medium thereto; a second conduit communicating with said vessel at a high point thereof, having a portion extending outwardly from said vessel for conveying a suspension of said solids in a gasiform medium therefrom and also having a part projecting downwardly within said vessel to an intermediate level provided with openings along a substantial length of its lower portion; conduit means comprising a passageway of variable effective area communicating with and connecting the space in the upper part of said vessel and said second conduit; and control means for varying said effective area of said passageway.

2. Apparatus in accordance with claim 1 in which the conduit means is arranged interiorly to said vessel and the control means is a valve.

3. Apparatus in accordance with claim 1 in which the conduit means is arranged exteriorly to said vessel and the control means is a valve.

4. Apparatus in accordance with claim 1 in which the downwardly projecting part is provided with at least a slot along a substantial length of its lower portion.

5. Apparatus in accordance with claim 1 in which the downwardly projecting part is provided with orifices along a substantial length of its lower portion.

JEWELL S. PALMER.

REFERENCES CITED

The following references are of record in the file of this patent:

UNITED STATES PATENTS

| Number | Name | Date |
| --- | --- | --- |
| 2,449,027 | Voorhees, Jr. | Sept. 7, 1948 |
| 2,458,866 | Martin | Jan 11, 1949 |
| 2,488,406 | Hirsch | Nov. 15, 1949 |